United States Patent [19]

Stuemky

[11] 4,408,786
[45] Oct. 11, 1983

[54] FERRULE, COUPLING AND COUPLING PROCESS

[75] Inventor: Robert E. Stuemky, Elizabeth, Colo.

[73] Assignee: The Gates Rubber Company, Denver, Colo.

[21] Appl. No.: 352,987

[22] Filed: Feb. 26, 1982

[51] Int. Cl.³ .............................................. F16L 33/20
[52] U.S. Cl. ...................................... 285/256; 29/508; 29/516; 285/259
[58] Field of Search ...................... 285/256, 259, 255; 29/508, 516

[56] References Cited

U.S. PATENT DOCUMENTS

| | | | |
|---|---|---|---|
| 1,969,548 | 8/1934 | Eastman | 285/256 |
| 2,028,316 | 1/1936 | Brunner | 285/256 |
| 2,031,823 | 2/1936 | Eastman | 285/256 X |
| 2,086,703 | 7/1937 | Eastman | 285/256 X |
| 2,556,544 | 6/1951 | Johnson | 285/256 X |
| 3,004,779 | 10/1961 | Cullen et al. | 285/256 X |
| 4,305,608 | 12/1981 | Stuemky et al. | 285/256 |

FOREIGN PATENT DOCUMENTS 1431227  4/1976  United Kingdom ................ 285/255

*Primary Examiner*—Thomas F. Callaghan
*Attorney, Agent, or Firm*—H. W. Oberg, Jr.; Raymond Fink; C. H. Castleman, Jr.

[57] ABSTRACT

A deformable ferrule for use in coupling hose which has a sidewall portion that decreases in thickness going longitudinally of the ferrule from a fitting end to a hose end. A method of deforming an exterior frustro-conical surface portion of the ferrule to a generally cylindrical shape while simultaneously forming an inside surface portion of the ferrule to a generally frustro-conical shape.

6 Claims, 10 Drawing Figures

FERRULE, COUPLING AND COUPLING PROCESS

BACKGROUND OF THE INVENTION

The invention relates to attachable couplings for hose, but more particularly, the invention relates to a deformable ferrule for use in coupling hose.

Couplings that are post assembled to flexible hose typically have a male stem portion that is insertable into a hose end and a ferrule that is concentric with the male stem. The ferrule may be preattached to the male stem or post attached to the male stem during a coupling process requiring deformation of the ferrule. Together, the male stem and ferrule define an annular cavity for receiving a hose end. The coupling is retained to the hose end by pinching or compressing it between the ferrule and stem. The ferrule may be preattached to the stem such as by crimping an end portion of the ferrule to a stem collar so that the annular hose receiving cavity is formed. A ferrule as a separate part, may be attached to a collar of the stem when the ferrule is deformed such as by crimping or swaging.

Some ferrules have a smooth bore and are deformed during crimping to provide what is known as a "ripple crimp" where a plurality of annular ridges and grooves are formed in the ferrule sidewall. The male stem may have a plurality of annular serrations or grooves to aid in gripping a hose end when a ferrule is deformed during the coupling process.

In some applications, circumferential, helical, or longitudinal ribs are provided on the inside of the ferrule to aid in gripping a hose end. Such ribs may contact an embedded reinforcement of the hose for greater coupling retention. The ferrules may be deformed to a generally cylindrical exterior shape such as by crimping or swaging.

A preattached ferrule having a constant wall thickness and a frustoconical shape to aid in inserting a hose end prior to deformation is shown in U.S. Pat. No. 3,530,900. During the coupling process, the frustroconical shaped ferrule is crimped to have a generally cylindrical shape with a plurality of circumferential ribs and grooves that cooperate to pinch the hose end.

A post attached ferrule is exemplified by U.S. Pat. No. 4,305,608. The ferrule has a plurality of longitudinally oriented ribs that are capable of penetrating a hose cover to embed with a hose reinforcement when the ferrule is deformed to have a generally cylindrical exterior shape. During crimping, portions of the ribs are deformed against a stem collar to define a means for attaching the ferrule to the male stem.

Another example of a preattached ferrule is shown in U.S. Pat. No. 4,226,446. A serrated stem and ferrule with a "ripple crimp" is used to pinch a hose end and retain a coupling. A difference in the pitch spacing between a "ripple crimp" and serrations on a male stem causes the hose to be pinched in progressively reduced amounts of compression even though the ferrule and stem define a generally annular cavity for receiving the hose end. While reduced pressure zones are recognized as being beneficial to minimize local stresses in a coupled hose end for improving coupling retention, special care must be taken to ensure that the pitch spacing of the ripple crimp is properly located with respect to the pitch spacing of the male stem so that reduced pressure zones are achieved.

Although U.S. Pat. No. 3,530,900 shows generally a pre-crimped frustoconical cavity for receiving a hose end, it and U.S. Pat. Nos. 4,226,446 and 4,305,608 show post crimped annular cavities for pinching or compressing a hose end. Of these, only U.S. Pat. No. 4,305,608 appears suitable for high pressure hose applications as indicated by ferrule ribs directly contacting a hose reinforcement.

SUMMARY OF THE INVENTION

In accordance with the invention, a deformable ferrule for use with a male stem in coupling hose is provided as a sleeve having a fitting end, hose end, and a sidewall portion that decreases in thickness going longitudinally of the sleeve toward the hose end. Ribs are optionally, but preferably, provided and project from an inside surface of the sleeve to aid in gripping a hose end. A deformed ferrule (e.g., as by crimping or swaging) defines a frustoconical surface for gripping a hose end. The frustoconical surface progressively reduces localized gripping stresses in the hose end.

The frustoconical inside surface may be formed during the deformation process when a ferrule having a frustoconical exterior surface is deformed to a generally cylindrical shape (e.g., such as by crimping or swaging).

An object of the invention is to provide a hose ferrule that controls decreasing pinching or compressing of a hose end during crimping in a direction from a fitting end of the ferrule toward the hose end of the ferrule.

This and other objects or advantages of the invention will be apparent after reviewing the drawings and description thereof wherein.

DESCRIPTION OF A PREFERRED EMBODIMENT

Figure 1:
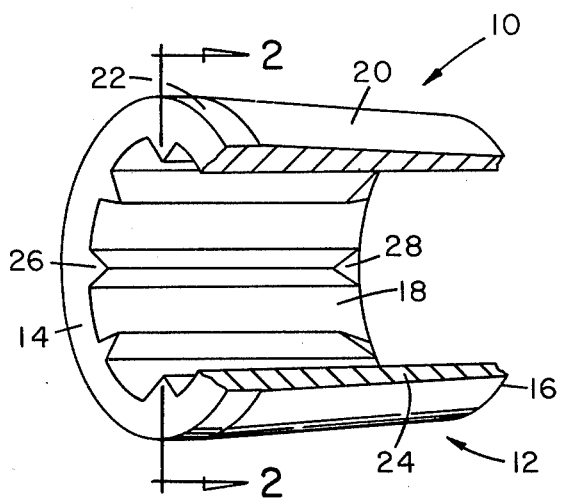
FIG. 1 is an isometric view of an embodiment of the ferrule of the invention partially cut away to expose inner surface portions of the ferrule.
Figure 2:
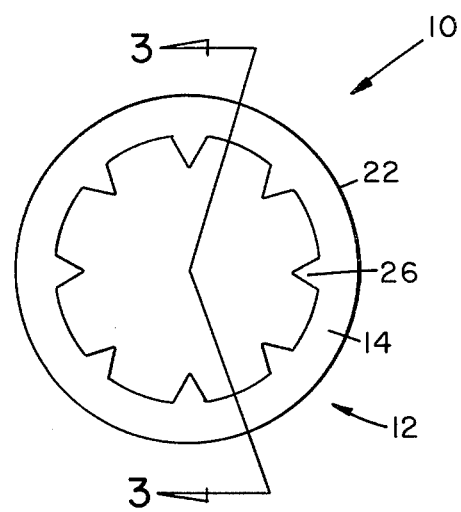
FIG. 2 is a full sectional view taken along the line 2—2 of FIG. 1.
Figure 4:
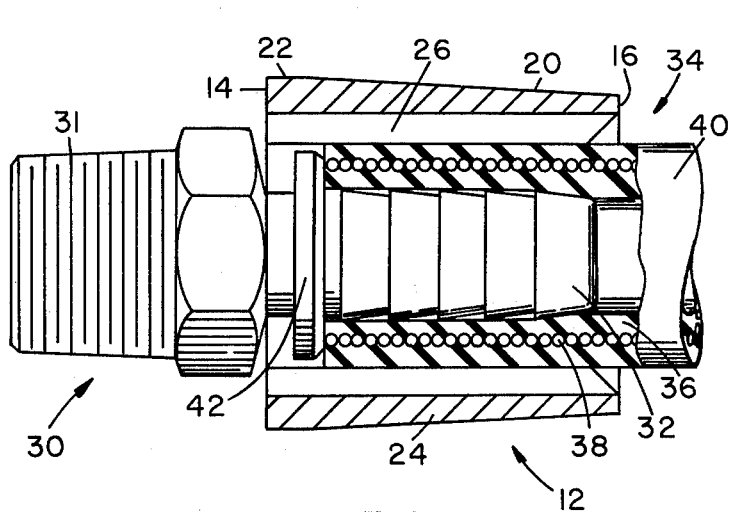
FIG. 4 is a partially cutaway sectional side view of a coupled hose assembly showing the ferrule of FIG. 3 prior to deformation.
Figure 3:
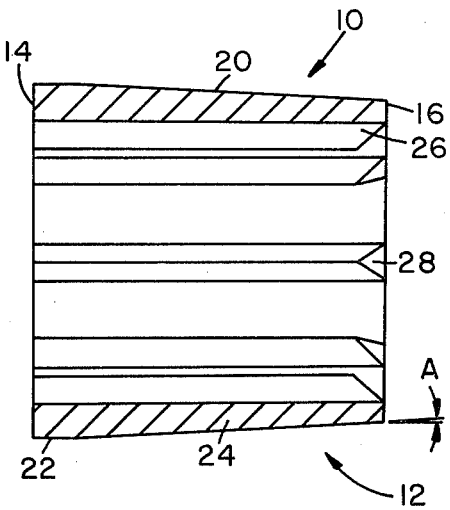
FIG. 3 is a sectional view taken along the line 3—3 of FIG. 2.

Referring to FIGS. 1 through 6, the ferrule 10 of the invention includes a sleeve-type body 12 having a fitting end 14, a hose end 16, a substantially cylindrical inner surface 18, and an exterior surface having a frustoconical surface portion 20 and, optionally, a cylindrical surface portion 22. The inner surface 18 and outer surface portion 20 outline a sidewall portion 24 that decreases in thickness going longitudinally of the body 12 toward the hose end 16. A plurality of circumferentially spaced ribs 26 are oriented longitudinally of the body and project from the inner surface. The ribs may extend a major length of the body and ends of the ribs may be tapered 28.

Figure 5:
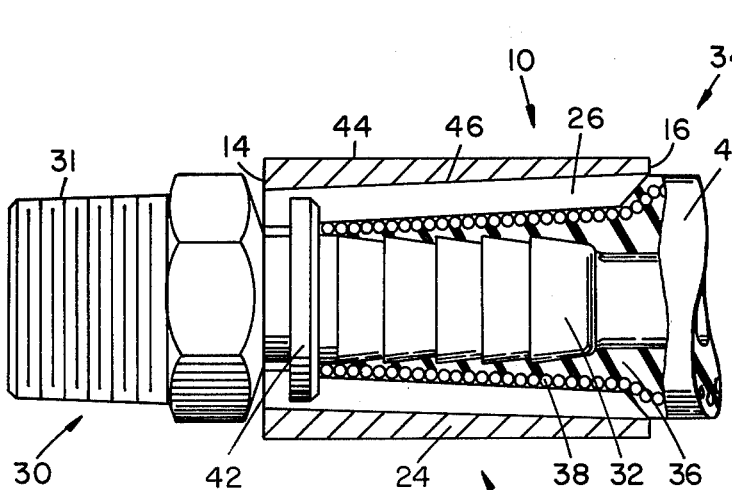
FIG. 5 is a view similar to that of FIG. 4 showing the ferrule deformed on a coupled hose.
Figure 6:
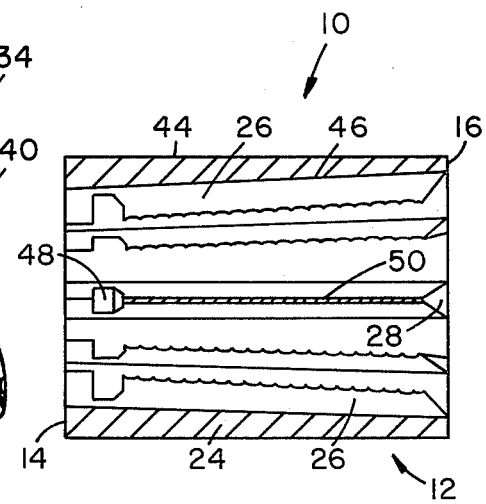
FIG. 6 is a view similar to FIG. 3 but showing the deformed ferrule of FIG. 5.

In service, the ferrule is used with a male stem 30 having some type of fitting 31 at one end and optionally, a serrated stem 32 at the other end. The ferrule is slipped over an end poriton of a hose 34 constructed with a tube 36, reinforcement 38, and cover 40 as exemplified by FIG. 4. The stem may also include a locking collar 42 for securing the ferrule to the stem in a manner as described in U.S. Pat. No. 4,305,608. The male stem is inserted in the hose bore and the ferrule is deformed by reducing it in diameter, such as by crimping or swaging, as illustrated by FIGS. 5 and 6. During deformation, the outer surface is changed to a generally cylindrical shape 44 and the inner surface is changed to a generally frustoconical shape 46. The ribs change from being what may be described as longitudinal elements of a cylinder (FIG. 3) to frustoconical elements of a cone (FIG. 6). Grooves 48 are formed in the ribs by the collar 42 and the hose reinforcement 38 is partially embedded 50 into portions of the ribs upon ferrule deformation. The ribs grip the reinforcement and the inner surface grips the hose end in a constantly decreasing manner to progressively reduce the amount of hose compression or pinching and thereby eliminate localized high stress points in the coupled hose at the hose end of the ferrule. The amount of reduction in wall thickness to effect a usable coupling will, of course, vary for different hoses and different applications. It has been determined that a satisfactory coupling is achieved when the outer frustoconical surface portion has a half conical angle A up to about 4 degrees. The cylindrical surface portion acts as an aid to reduce coupling skewing during crimping by being the first surface contacted and held by radially moving cylindrical elements of a crimping machine of the type well known in the art.

ADDITIONAL EMBODIMENTS

Figure 7:
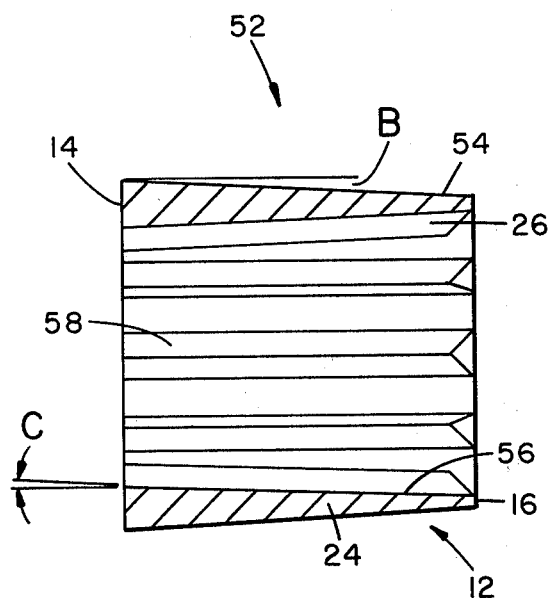
FIGS. 7-10 are sectional views like FIG. 3 with each showing a further embodiment of the invention.

Additional examples of ferrules of the invention are illustrated in FIGS. 7 through 10. All of the ferrules exhibit a sidewall portion 24 that decreases in thickness going longitudinally of the ferrule toward the hose end 16. All of the ferrules exhibit on deformation, an outer surface that is generally cylindrically shaped and an inner surface portion that is generally frustoconical shaped. More specifically, FIG. 7 illustrates a ferrule 52 having a frustoconical outer surface 54 at a half angle B and a frustoconical inner surface 56 at a conical half angle C. The angles B, C need not be equal. Longitudinally oriented ribs 58 extend from the interior surface as elements of the frustoconical surface 56. In use, the outer surface 54 is deformed to a generally cylindrical section in a manner described in reference to FIGS. 5 and 6. Such deformation increases angle C.

Figure 8:
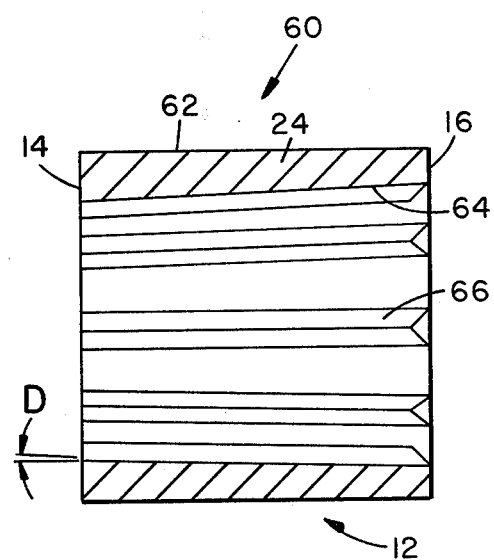

FIG. 8 illustrates a ferrule 60 having a generally cylindrical outer surface 62 and a frustoconical inner surface 64 having a conical half angle D. During deformation, the ferrule is reduced to a smaller diameter with the outer surface remaining substantially cylindrical and the inner surface remaining frustoconical so that the hose end receives progressively reduced amounts of pinching or compression. Longitudinally oriented ribs 66 extend along the inner surface as elements of the frustoconical surface 64.

Figure 9:
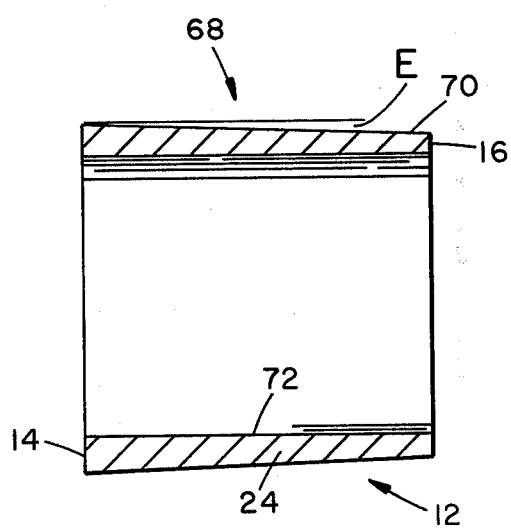

A ferrule 68 without any ribs is shown at FIG. 9. The ferrule is similar to the one shown at FIG. 3 except that the outer surface 70 is frustoconical throughout the length of the ferrule at a conical half angle E. The inner surface 72 is substantially cylindrically shaped. The ferrule deforms in a manner similar to that shown by FIGS. 5 and 6 with the outer surface 70 becoming substantially cylindrical and the inner surface 72 becoming substantially frustoconical.

Figure 10:
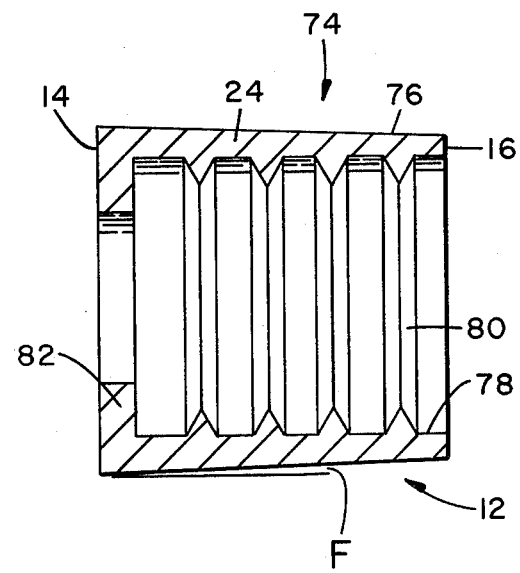

The ferrule 74 of FIG. 10 is similar to that of FIG. 9 and has a frustoconical outer surface 76 that extends at a half angle F throughout the length of the ferrule. The inner surface 78 is substantially cylindrical and contains a plurality of longitudinally spaced circumferential ribs 80. A collar 82 is used to extend behind the stem collar 42 when the ferrule 74 is deformed to a smaller diameter. As with the previously described ferrules, the outer surface 76 is changed to a generally cylindrical shape and the inner surface 78 is changed to a frustoconical shape when the ferrule is deformed such as by crimping or swaging. The circumferential ribs provide succeeding crimp zones that are progressively reduced in an amount of compression from the fitting end to the hose end. While such zones provide localized increased stresses in the hose, they also progressively reduce the amount of stress in the hose to prevent a high stress area at the hose end of the ferrule.

The foregoing detailed description is made for purpose of illustration only and is not intended to limit the scope of the invention which is to be determined from the appended claims.

What is claimed is:

1. In a deformable ferrule for use in coupling hose and of the type having a sleeve-type body with an outer surface, an inner surface, a fitting end and a hose end, the improvement comprising:

the sleeve-type body which has a sidewall portion that decreases in thickness going longitudinally of the body toward the hose end and whereupon deformation of the body when coupling hose, the outer surface has a generally cylindrical shape and the inner surface juxtaposed said sidewall portion has generally a frustoconical shape; and a plurality of generally parallel and spaced apart ribs extending from the inner surface and generally longitudinally oriented with the body, whereupon deformation of the body, the ribs are generally oriented as frustoconical elements of a cone where the circumferential spacing between ribs near the fitting end is reduced and becomes smaller than the circumferential spacing near the hose end.

2. The ferrule as claimed in claim 1 wherein one of the body surfaces has a portion that is generally frustoconically shaped.

3. The ferrule as claimed in claim 2 wherein the frustoconical surface portion has a conical angle that is no greater than about 4 degrees.

4. The ferrule as claimed in claim 1 wherein the outer surface of the body has a portion that is generally frustoconical.

5. The ferrule as claimed in claim 1 wherein the inner surface of the body has a portion that is generally frustoconical.

6. A method for providing a frustoconical surface portion along an inside surface of a ferrule to effect progressively reduced amounts of compression when coupling a hose comprising the steps of:

providing a ferrule having a sleeve-type body with a fitting end, a hose end, a substantially cylindrical inner surface with a plurality of generally parallel and circumferentially spaced apart ribs extending inwardly from the inner surface and substantially longitudinally oriented with the body and an outer surface which has a generally frustoconical surface portion that with the inner surface defines a sidewall portion of the ferrule that decreases in thickness going longitudinally of the body toward the hose end; and deforming the ferrule to have a generally cylindrical outer shape while simultaneously forming a frustoconical surface portion along the inner surface of the ferrule while simultaneously changing the ribs to be generally oriented as frustoconical elements of a cone where the circumferential spacing between ribs near the fitting end is reduced and is smaller than the circumferential spacing between ribs near the hose end.

* * * * *